Feb. 13, 1934.   G. A. MORRIS   1,946,806
TIRE VALVE CAP
Filed March 11, 1931
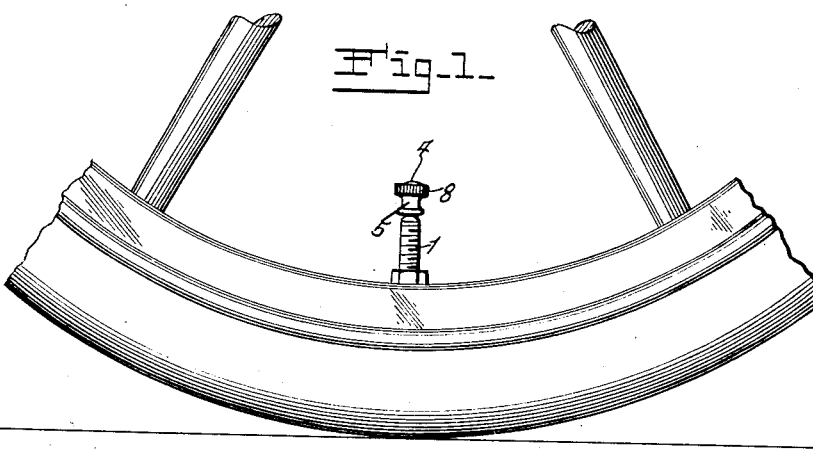
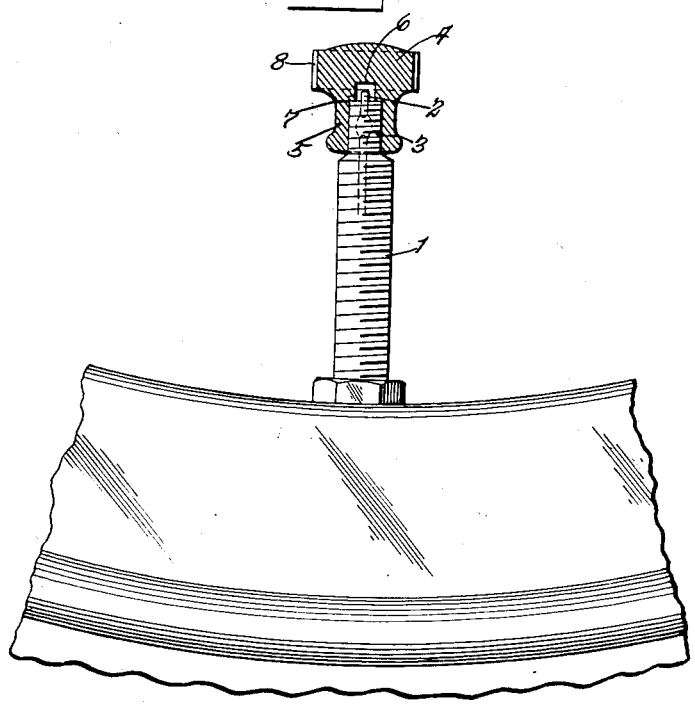
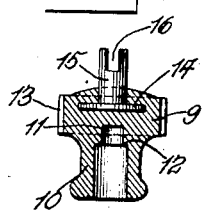
Inventor
George A. Morris
by Rupsey & Kingsland
His Attorneys Patented Feb. 13, 1934

1,946,806

UNITED STATES PATENT OFFICE 1,946,806

TIRE VALVE CAP

George A. Morris, St. Louis, Mo.

Application March 11, 1931. Serial No. 521,627

2 Claims. (Cl. 152—12)

This invention relates to tire valve caps of the type applied to the ends of pneumatic tire valve devices in order to cover the inner ends thereof, to prevent the lodgment of foreign substances therein, and to protect the valve stem from damage.

According to present practice, caps used in connection with tire valves are usually of metal and must be screwed off and on as many times as the tires are filled with air. The ordinary tire valve caps are made of metal and are long internally threaded cylindrical elements that require considerable time for their application and removal.

An object of the present invention is to provide an improved compact tire valve cap of novel construction and composed of elastic material that may be applied to and removed from the reduced threaded end of a valve tube entirely beyond the usual circumferential shoulder of the tube, without the usual screwing and unscrewing manipulation required to apply and remove the usual threaded tire valve caps.

Another object of the invention is to provide an elastic tire valve cap that may be applied to and removed from the threaded end of a valve tube without screwing and unscrewing action and which is equipped with a member designed and adapted to be engaged with the end of the tire valve stem in order to manipulate, adjust, insert or remove the valve from the housing in which it is mounted.

Another object of the invention is to provide an improved elastic tire valve cap that may be manufactured and sold at comparatively low cost and which comprises many or all of the advantages herein disclosed, reference being made to the accompanying drawing, in which—

Fig. 1 is a side elevation of a tire valve equipped with my improved tire valve cap.

Fig. 2 is an enlarged sectional view of my improved tire valve cap in connection with the tire valve device.

Fig. 3 is an enlarged longitudinal sectional view of an embodiment of the invention equipped with a valve manipulating member.

The tire valve in connection with which I have shown the present invention is of very well known and familiar construction, such as is now used in connection with nearly all pneumatic tires. The device comprises an elongated externally threaded tube 1 in which the valve mechanism is mounted. The valve that is mounted in the elongated externally threaded valve tube 1 may be opened by forcing inwardly the longitudinally movable stem 2 that protrudes beyond the open end of the reduced tube end portion 1ª. The outer end of the valve tube 1 comprises a portion 3 of reduced diameter which is also externally threaded and is defined from the body of the tube 1 by a circumferential shoulder. My present invention is designed and constructed to engage the reduced tube portion 3 and abut against the circumferential shoulder as clearly shown in Fig. 2. The device comprises a body 4 of rubber or other elastic and pliable material having protruding from one side thereof a tubular portion 5. The internal diameter of the tubular portion 5 is slightly less than the entire diameter of the cap engaging portion 3 of the tire valve tube. The tubular portion 5 is just long enough to pass onto the tube portion 3 and abut against the circumferential shoulder on the tube while the bottom wall of the cap portion 5 seats against the end of the tube. The tubular portion 5 of the cap has a cavity 6 at its inner end, the wall of which is defined from the cavity in the tubular portion 5 by an internal shoulder 7. The periphery of the body 4 is preferably formed with a grooved or otherwise irregular surface 8 constituting a portion that may be easily gripped between the thumb and any one of the fingers for application and removal of the device. The body 4, being of larger diameter than the tubular portion 5 and extending well beyond the valve tube, constitutes a handle whereby the cap may be easily manipulated and applied and removed from a valve tube. The end of the tubular portion 5 is formed with a circumferential rib or bead that substantially reinforces and strengthens the end of the tube.

The device described is applied to the externally threaded cap receiving portion 3 of the tire valve tube by forcing the tubular portion 5 of the elastic tire valve cap onto the threaded end portion 3 until the end of the tubular portion 5 abuts the circumferential shoulder on the valve tube. Because of the elasticity of the material of which the device is composed, portions of said material are engaged and interlocked with the threads on the valve tube end portion 3, so that the tire valve cap will not become detached under the vibrations to which it is subjected when in use. This is true because relatively considerable pressure is required to force the cap onto and to remove the cap from the valve tube. However, this force does not in any way damage the threads on the valve tube nor is it damaging to the device.

When in position, the shoulder 7 abuts against the end of the valve tube while the protruding end of the stem 2 is received in the cavity 6 and thereby is shielded and guarded and protected without being held open.

The tire valve cap shown in Fig. 3 is composed of an elastic body 9 of rubber or other appropriate elastic material having an elastic tubular extension 10 from one side. The opening in the tubular extension 9 communicates with a recess 11 that is of smaller diameter than the tubular opening in the extension 10, a shoulder 12 being formed at the communication of the cavity 11 with the tube. The body 9 is formed with an irregular grip surface 13 that may be readily engaged and held between the thumb and any of the fingers of the hand.

The body 9 embeds a head 14 from which projects a stem 15 having in its outer end a groove 16 designed and adapted to be engaged with the end of the stem 2 in order to manipulate, adjust, remove or insert the tire valve. The device of Fig. 3 varies from the device shown in Figs. 1 and 2 only in the inclusion of the tire valve manipulating member.

This invention may be manufactured and sold at a very low cost and is capable of removal and application much more quickly than the usual screwed on metallic tire valve caps may be removed and applied. This device may be removed and applied merely by the application of proper force without resort to screwing or unscrewing action. In the aggregate, by use of these devices, a considerable amount of time is saved whenever it is necessary to charge the tires with air or to remove or adjust the tire valves.

I claim:—

1. An external cap for the reduced threaded end of a tire valve tube, composed of elastic material and comprising a body of relatively large diameter constituting a handle, and a tubular portion of less diameter than and projecting from said body and having an unthreaded inner surface and an internal diameter slightly less than the external diameter of the reduced threaded end of the valve tube to which the cap is to be applied, said tubular portion being arranged to expand and receive said reduced threaded end of said valve tube and having a length approximately equal to the length of said reduced threaded end.

2. An external cap for the reduced threaded end of a tire valve tube, composed of elastic material and comprising a body of relatively large diameter constituting a handle, and a tubular portion of less diameter than and projecting from said body and having an unthreaded inner surface and an internal diameter slightly less than the external diameter of the reduced threaded end of the valve tube to which the cap is to be applied.

GEORGE A. MORRIS.